(12) United States Patent
Han et al.

(10) Patent No.: US 10,643,372 B2
(45) Date of Patent: May 5, 2020

(54) METHOD FOR RECONSTRUCTING THREE-DIMENSIONAL INFORMATION OF OBJECT AND APPARATUS FOR THE SAME

(71) Applicant: ELECTRONICS AND TELECOMMUNICATIONS RESEARCH INSTITUTE, Daejeon (KR)

(72) Inventors: Byung Ok Han, Daejeon (KR); Jae Hwan Kim, Daejeon (KR); Ho Won Kim, Seoul (KR); Yu Gu Jung, Daejeon (KR); Chang Joon Park, Daejeon (KR); Gil Haeng Lee, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 235 days.

(21) Appl. No.: 15/836,542

(22) Filed: Dec. 8, 2017

(65) Prior Publication Data
US 2019/0156552 A1      May 23, 2019

(30) Foreign Application Priority Data

Nov. 22, 2017 (KR) .......................... 10-2017-0156691

(51) Int. Cl.
*G06T 15/08* (2011.01)
*G06T 5/00* (2006.01)
*G06T 15/20* (2011.01)
*G06T 7/55* (2017.01)

(52) U.S. Cl.
CPC .............. *G06T 15/08* (2013.01); *G06T 5/002* (2013.01); *G06T 5/005* (2013.01); *G06T 7/55* (2017.01); *G06T 15/205* (2013.01); *G06T 2207/10028* (2013.01)

(58) Field of Classification Search
CPC ....... G06T 5/002; G06T 15/08; G06T 15/205; G06T 2207/10028
USPC ........................................................ 382/154
See application file for complete search history.

(56) References Cited

U.S. PATENT DOCUMENTS

| 8,587,583 | B2* | 11/2013 | Newcombe ............. G06T 17/00 345/420 |
| 9,294,753 | B2 | 3/2016 | Lee et al. |
| 9,384,585 | B2 | 7/2016 | Kim et al. |
| 9,639,943 | B1 | 5/2017 | Kutliroff et al. |

(Continued)

FOREIGN PATENT DOCUMENTS

| JP | H06258048 A | 9/1994 |
| JP | 2002540537 A | 11/2002 |
| KR | 10-1665049 B1 | 10/2016 |

*Primary Examiner* — Daniel G Mariam

(57) ABSTRACT

The present disclosure provides a method and apparatus for reconstructing 3D information of an object. The method of reconstructing 3D information of an object may include: reconstructing 3D information of a background space, using at least one of images of the background space for three-dimensionally reconstructing the object; separating the object from the background space on the basis of at least one of images of the object in the background space, and of obtaining a depth image of the object separated from the background space; and generating 3D information of the object based on images taken by at least one of cameras in consideration of position relationships between the depth image of the object and the cameras.

14 Claims, 7 Drawing Sheets

(56) References Cited

U.S. PATENT DOCUMENTS

| | | |
|---|---|---|
| 2006/0067562 A1 | 3/2006 | Kamath et al. |
| 2010/0182406 A1* | 7/2010 | Benitez .................... G06T 7/55 348/46 |
| 2012/0306876 A1 | 12/2012 | Shotton et al. |
| 2018/0218485 A1* | 8/2018 | Xi ............................ G06T 5/50 |
| 2018/0253894 A1* | 9/2018 | Krishnan ............... G06T 15/08 |

* cited by examiner

Fig. 2B
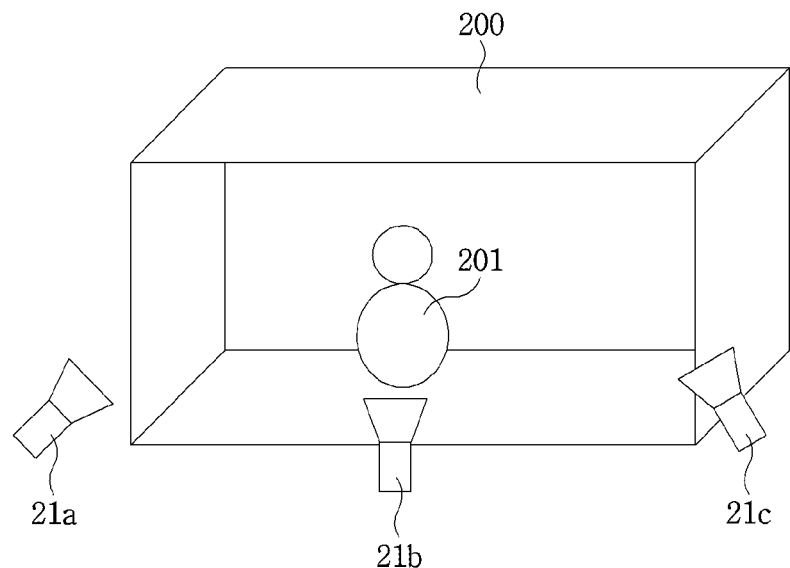
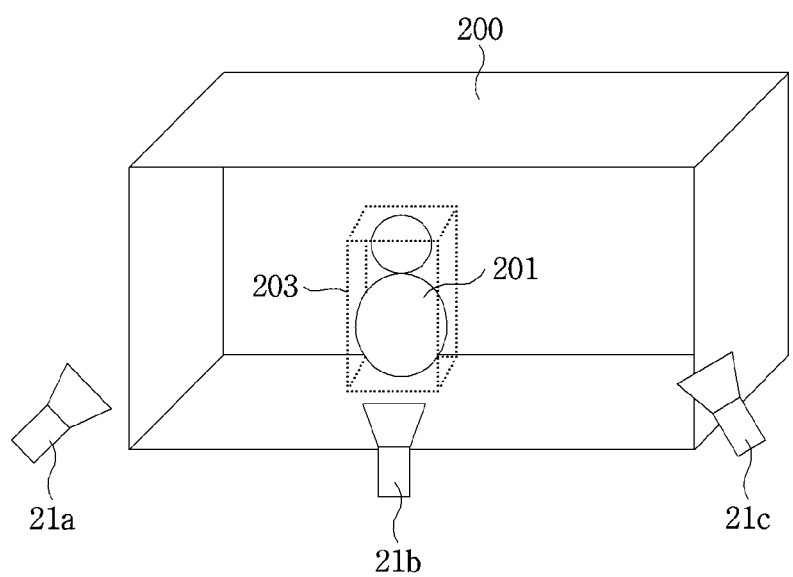
Fig. 2C

METHOD FOR RECONSTRUCTING THREE-DIMENSIONAL INFORMATION OF OBJECT AND APPARATUS FOR THE SAME

CROSS REFERENCE TO RELATED APPLICATION

The present application claims priority to Korean Patent Application No. 10-2017-0156691, filed Nov. 22, 2017, the entire contents of which is incorporated herein for all purposes by this reference.

BACKGROUND OF THE INVENTION

Field of the Invention

The present disclosure relates to an image processing technology and, more particularly, to a method of modeling a 3D object using a depth image and an apparatus for the same.

Description of the Related Art

Recently, as the processing ability of processors has been improved and 3D engines have been developed, demand for 3D image display on various devices has increased. 3D image display is requested for not only a high-performance PC such as a workstation, but devices including a display such as a TV, a PMP, an MP3 player, and a mobile phone.

Further, the available field of 3D display has been expanded from a simulation system and a virtual reality system to not only the game such as an on-line game, a console game, and a mobile game, but an avatar system, a user interface, animation etc.

As more 3D contents are increasingly consumed, an interest in creation of 3D contents is increased, and the interest in creation of 3D contents that is the basis of manufacturing a 3D model is increased in contribution to commercialization of a 3D printer, etc.

In response to these requests from users, recently, a consumer-level depth sensor that is connected to a computing system (for example, Kinect by Microsoft (R)) and a mobile terminal that has a 3D modeling function are attempted to be commercialized.

SUMMARY OF THE INVENTION

In order to scan a 3D object, static camera & moving object-based scanning and moving camera & static object-based scanning have been used.

The static camera & moving object-based scanning is a method that scans an object while rotating or moving the object with a camera fixed. The static camera & moving object-based scanning is difficult to use when an object is difficult to move because a camera is fixed.

The moving camera & static object-based scanning is a method that scans a fixed object while moving a camera. Since the moving camera & static object-based scanning moves a camera when scanning an object, there is a need for a space for moving or rotating the camera, so convenience of 3D reconstruction is decreased. Further, since an object is fixed in the moving camera & static object-based scanning, there may be shade that are not imaged by a camera, so it is impossible to accurately reconstruct 3D information on the shade.

The present disclosure has been made in an effort to solve the problems and an objective of the present disclosure is to provide a method for reconstructing 3D information, the method being able to move a camera and an object, and an apparatus for reconstructing 3D information.

The technical problem to implement in the present disclosure are not limited to the technical problems described above and other technical problems that are not stated herein will be clearly understood by those skilled in the art from the following specifications.

According to an aspect of the present disclosure, there is provided a method of reconstructing 3D information of an object. The method of reconstructing 3D information of an object includes: reconstructing 3D information of a background space, using at least one of images of the background space for three-dimensionally reconstructing the object; separating the object from the background space on the basis of at least one of images of the object in the background space, and of obtaining a depth image of the object separated from the background space; and generating 3D information of the object based on images taken by at least one of cameras in consideration of position relationships between the depth image of the object and the cameras.

According to another aspect of the present disclosure, there is provided an apparatus for reconstructing 3D information of an object. The apparatus for reconstructing 3D information of an object includes: at least one of cameras taking images for reconstructing 3D information; a background information reconstructor reconstructing 3D information of a background space for three-dimensionally reconstructing an object, using at least one of images of the background space; a background/object separator separating the object from the background space on the basis of at least one of images of the object in the background space, and obtaining a depth image of the object separated from the background space; and a 3D information reconstructor generating 3D information of the object based on images taken by the cameras in consideration of positional relationships between the depth image of the object and the cameras.

The features briefly provided above in connection with the present disclosure are just examples for describing the present disclosure and do not limit the scope of the present disclosure.

According to the present disclosure, a method and apparatus for reconstructing 3D information of an object by moving both a camera and the object can be provided.

Further, according to the present disclosure, a method and apparatus that can freely scan an object without restrictions because it is possible to move both a camera and the object can be provided.

Further, according to the present disclosure, a method and apparatus that can scan all areas of an object without shade because it is possible to move both a camera and the object can be provided.

Further, according to the present disclosure, a method and apparatus that accurately reconstructs 3D information of an object can be provided because it is possible to scan all areas of an object without shade.

The effects of the present disclosure are not limited to the effects described above and other effects can be clearly understood by those skilled in the art from the following description.

BRIEF DESCRIPTION OF THE DRAWINGS

The above and other objects, features and other advantages of the present disclosure will be more clearly understood from the following detailed description when taken in conjunction with the accompanying drawings, in which:

FIG. 2B is a view exemplifying a depth image of an object that an apparatus for reconstructing 3D information of an object according to an embodiment of the present disclosure determines while reconstructing 3D information of the object;

FIG. 2C is a view exemplifying a volume space of an object that an apparatus for reconstructing 3D information of an object according to an embodiment of the present disclosure determines while reconstructing 3D information of the object;

DETAILED DESCRIPTION OF THE INVENTION

Figure 1:
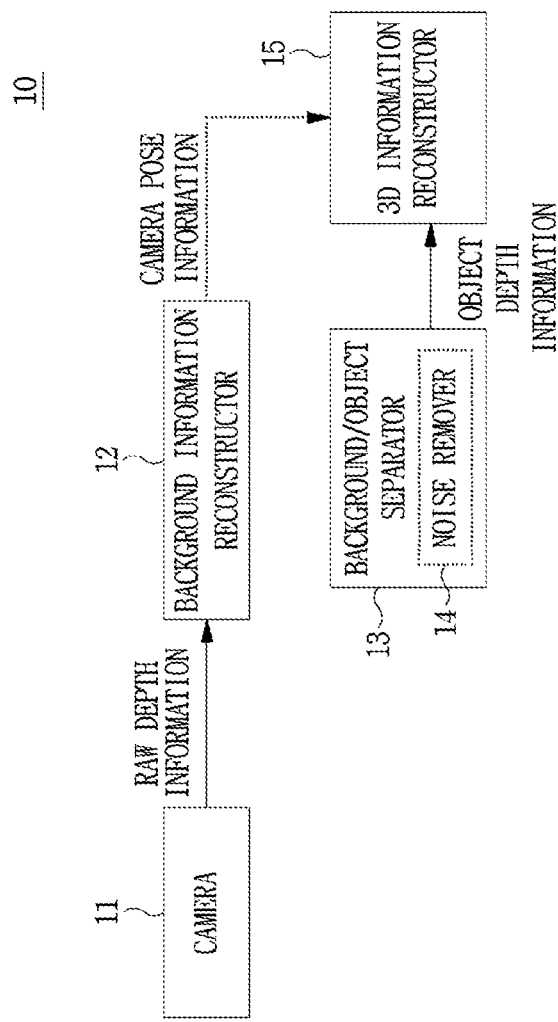
FIG. 1 is a block diagram showing the configuration of an apparatus for reconstructing 3D information of an object according to an embodiment of the present disclosure.

Embodiments of the present disclosure will be described in detail with reference to the accompanying drawings for those skilled in the art to be able to easily implement he present disclosure. However, the present disclosure may be modified in various different ways and is not limited to the embodiments described herein.

In describing embodiments of the present disclosure, well-known functions or constructions will not be described in detail when it is determined that they may obscure the spirit of the present disclosure. Further, parts not related to description of the present disclosure are not shown in the drawings and like reference numerals are given to like components.

It is to be understood in the following description that when one component is referred to as being "connected to", "combined with", or "coupled to" another component, it may include not only direction connection, but indirect connection with another component therebetween. It will be further understood that when a component "comprises" or "has" another component, it means that the component may further include another component, not excluding another component unless stated otherwise.

Terms used in the specification, "first", "second", etc. can be used to discriminate one component from another component, but the order or priority of the components are is not limited unless specifically stated. Accordingly, a first component in an embodiment may be referred to as a second component in another element, and similarly, a second component in an embodiment may be referred to as a first component in another embodiment within the scope of the present disclosure.

In the following description, components are discriminated from each other to clearly describe their characteristics, but it does not mean that they are necessarily separated. That is, a plurality of components may be integrated in one hardware or software module and one component may be divided into a plurality of hardware or software modules. Accordingly, integrated or divided embodiments are included in the scope of the present disclosure even if not specifically stated.

In the following description, components described with reference to various embodiments are not all necessarily required and some components may be selectively used. Accordingly, embodiments composed of some of the components described in an embodiment are also included in the scope of the present disclosure. Further, embodiments additionally providing components to components of various embodiments are also included in the scope of the present disclosure.

In the following description, moving a camera around or with respect to an object means moving the camera within a range in which the camera can image the object regardless of whether the object is fixed, and moving or rotating the object around or with respect to the camera means moving or rotating the object within a range in which the camera can image the object regardless of whether the camera is fixed.

Hereinafter, embodiments of the present disclosure will be described with reference to the accompanying drawings.

FIG. 1 is a block diagram showing the configuration of an apparatus for reconstructing 3D information of an object according to an embodiment of the present disclosure.

Referring to FIG. 1, an apparatus 10 for reconstructing 3D information of an object may include at least one camera 11, a background information reconstructor 12, a background/object information separator 13, and a 3D information reconstructor 15.

The camera 11 may be a device that takes images for reconstructing 3D information.

The camera 11 may include a device that can generate and provide depth information (for example, a depth image) of an object to be imaged.

The background information reconstructor 12 reconstructs 3D information of a background space using at least one image of the background space for three-dimensionally reconstructing an object.

In detail, it is possible to assume that the background space is fixed without moving, so it is possible to reconstruct 3D information of the background space by tracking movement of the camera 11 and using at least one image provided by the camera 11. For example, it is possible to reconstruct 3D information of the background space on the basis of point-based volumetric representation, surface-based volumetric representation, and implicit surface-based volumetric representation.

As described above, when 3D information of the background space is reconstructed by the background information reconstructor 12, it is possible to accurately reconstruct 3D information of an object in a common space environment without composing a specific environment for 3D reconstruction of the object.

Further, reconstructing the 3D information of the background space makes it possible to calculate the absolute position between the camera 11 and the object rather than the relative postures of the camera 11 and an object. This can be used to generate information for helping movement (for example, rotation and movement) of the camera 11 or the object in order to more accurately generate 3D information of the object.

The background/object information separator 13 can receive at least one image of an object in the background space with the 3D information of the background space reconstructed. Further, the background/object information separator 13 can separate the object from at least one image of the object in the background space. For example, the background/object information separator 13 can determine the 3D information of the background space and can estimate an image of the background space that can be obtained at a position corresponding to the camera 11 taking the at least one image. The background/object information separator 13 can determine a difference between the image of the object and the estimated image of the background space, can extract outlier of the object on the basis of the difference, and can obtain a depth image of the object on the basis of the outlier.

Further, the depth image of the object extracted on the basis of the outlier may include noise that a consumer-level depth sensor has. In order to remove the noise, the background/object information separator 13 may include a noise remover 14. The noise remover 143 may be include an erosion filter, a bilateral filter etc. The background/object information separator 13 can remove undesired small noise through the erosion filter and can smooth the surface value and emphasis the edge of the depth image through the bilateral filter.

As another embodiment, the noise remover 14 can remove the noise by calculating in advance a noise model reflecting the characteristic of the depth sensor and applying the calculated noise model to the depth image of the object extracted on the basis of the outlier.

The 3D information reconstructor 15 generates 3D information of the object on the basis of an image taken by the camera 11 in consideration of the positional relationship between the depth image of the object and the camera 11.

Since the background/object information separator 13 separates the area where the object exists, when the camera is moved around the object, the 3D information reconstructor 15 can determine the relative position between the camera 11 and the object, so it can reconstruct the 3D information of the object from the image obtained by the camera 11. Further, even if the object is moved with respect to the camera 11, the 3D information reconstructor 15 can determine the relative position between the camera 11 and the object on the basis of the 3D information of the background space, so it can reconstruct the 3D information of the object from the image obtained by the camera 11. As described above, the 3D information reconstructor 15 can reconstruct 3D information of the object using the relative position between images on the basis of depth images of the object separated from the background even if the camera 11 or the object is moved.

The 3D information reconstructor 15 can process an operation of generating a state map of an object volume space by setting an object volume space corresponding to the area where the object is positioned and then matching the 3D information of the background space and the depth images of the object with each other. Further, the 3D information reconstructor 15 can remove image information corresponding to a substance holding the object, using a state change technique that uses slow adaptation. For example, a user can pick up and move or rotate the object by hand, in which the user's hand is added to the outer surface of the object, so it needs to be removed. An object can continuously exist in the object volume space, but the substance (for example, a user's hand) for holding the object can exist only for a relatively short time in the object volume space. In consideration of this fact, the 3D information reconstructor 15 can detect the object by changing a state by applying slow adaptation to the object in the object volume space. That is, the 3D information reconstructor 15 can determine only elements (for example, a point or an area) that exist over a predetermined time in the object volume space as elements constituting the object. In contrast, it is possible to determine an element existing under the predetermined time in the object volume space as a substance (for example, a user's hand) and remove the element.

The 3D information reconstructor 15 can reconstruct 3D information of the object by combining a depth image of the object detected by moving the object, that is, a depth image obtained from images taken when the object is moved or rotated with respect to the camera 11, and a depth image of the object detected by moving the camera 11, that is, a depth image obtained from images taken when the camera 11 is moved or rotated around the object.

An operation of reconstructing 3D information of an object by the apparatus for reconstructing 3D information of an object according to an embodiment of the present disclosure is described hereafter.

Figure 2A:
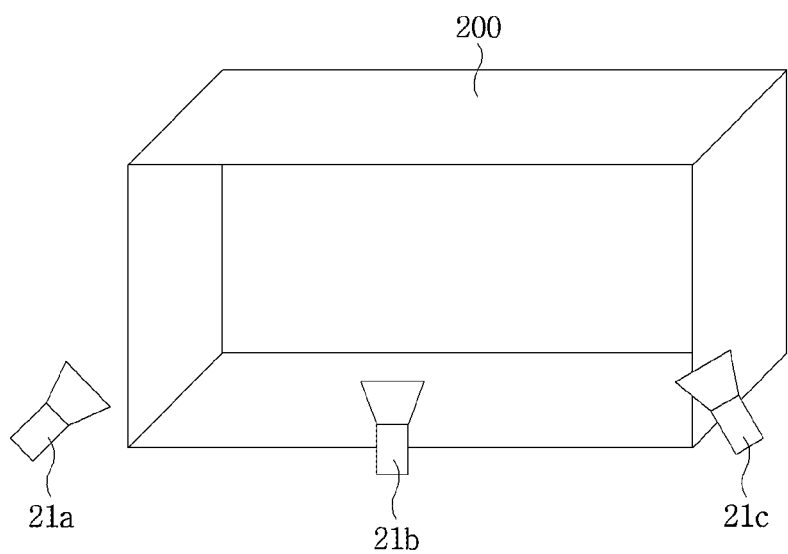
FIG. 2A is a view exemplifying 3D information in a background space that an apparatus for reconstructing 3D information of an object according to an embodiment of the present disclosure determines while reconstructing 3D information of an object.

FIGS. 2A to 2E are views illustrating information that is determined when the apparatus for reconstructing 3D information of an object according to an embodiment of the present disclosure reconstructs 3D image of an object. FIG. 2A exemplifies 3D information of a background space, FIG. 2B exemplifies depth images of an object, FIG. 2C exemplifies a volume space of the object, FIG. 2D exemplifies depth images of an object detected by moving the object, and FIG. 2E exemplifies depth images of the object detected by moving cameras.

Referring to FIG. 2A first, at least one of cameras 21a, 21b, and 21c take images of a background space 200 for three-dimensionally reconstructing an object and the background information reconstructor 12 reconstructs 3D information of the background space 200 using at least one of images of the background space 200 for three-dimensionally reconstructing the object.

For example, the background information reconstructor 12 can reconstruct 3D information of the background space 200 on the basis of point-based volumetric representation, surface-based volumetric representation, and implicit surface-based volumetric representation.

Next, referring to FIG. 2B, an object 201 is put in the background space 200 with the 3D information of the background space 200 reconstructed.

The cameras 21a, 21b, and 21c can take at least one of images of the object 201 in the background space 200 and provide the images of the object 210 in the background space 200 to the background/object information separator 13. Accordingly, the background/object information separator 13 can separate the object 201 from the background space 200 on the basis of the 3D information of the background space 200. For example, the background/object information separator 13 can determine the 3D information of the background space 200 and can estimate images of the background space that can be obtained at positions corresponding to the cameras 11 taking the at least one of images. The background/object information separator 13 can determine differences between the images of the object 201 and the estimated images of the background space, can extract outlier of the object on the basis of the differences, and can obtain a depth image of the object on the basis of the outlier.

Further, the depth image of the object extracted on the basis of the outlier may include noise that a consumer-level depth sensor has, and the noise can be removed by an erosion filter and a bilateral filter. As another embodiment, the noise in the depth image of the object may be removed in consideration of a noise model reflecting the characteristic of the depth sensor.

Next, the 3D information reconstructor 15 can generate 3D information of the object on the basis of the images taken by the cameras 11 in consideration of the positional relationships between the depth image of the object and the cameras 11.

In detail, referring to FIG. 2C, the 3D information reconstructor 15 can generate a state map of an object volume space 203 by setting the object volume space 203 corresponding to the area where the object 201 exists on the basis of the depth image of the object 201 and matching the 3D information of the background space 200 and the depth image of the object with each other.

Figure 2D:
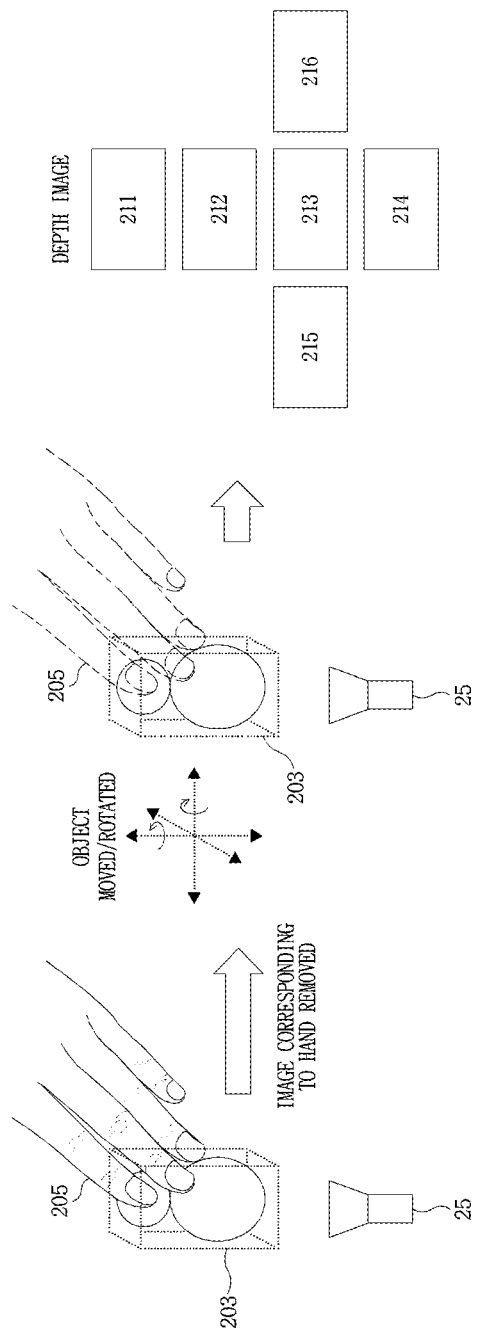
FIG. 2D is a view exemplifying a depth image of an object that is detected by movement of the object when an apparatus for reconstructing 3D information of an object according to an embodiment of the present disclosure reconstructs 3D information of the object.

Next, referring to FIG. 2D, a user can pick up and move or rotate the object 201 with his/her hand 205, but in this case, the user's hand 205 is added to the outer surface of the object, so it needs to be removed. The 3D information reconstructor 15 can remove image information corresponding to the user's hand 205, using a state change technique that uses slow adaptation. For example, an object can continuously exist in the object volume space 203, but the user's hand 205 can exist only for a relatively short time in the object volume space 203. In consideration of this fact, the 3D information reconstructor 15 can detect the object 201 by changing a state by applying slow adaptation to the object in the object volume space 203. That is, the 3D information reconstructor 15 can determine only elements (for example, a point or a surface) that exist over a predetermined time in the object volume space 203 as elements constituting the object 201. In contrast, it is possible to determine an element existing under the predetermined time in the object volume space 203 as the user's hand 205 and remove the element.

As described above, the 3D information reconstructor 15 can obtain at least one of images 211, 212, 213, 214, 215, and 216 by moving or rotating the object 201 and can remove the user's hand 205 from the images 211, 212, 213, 214, 215, and 216 using the state change technique that uses slow adaptation.

Figure 2E:
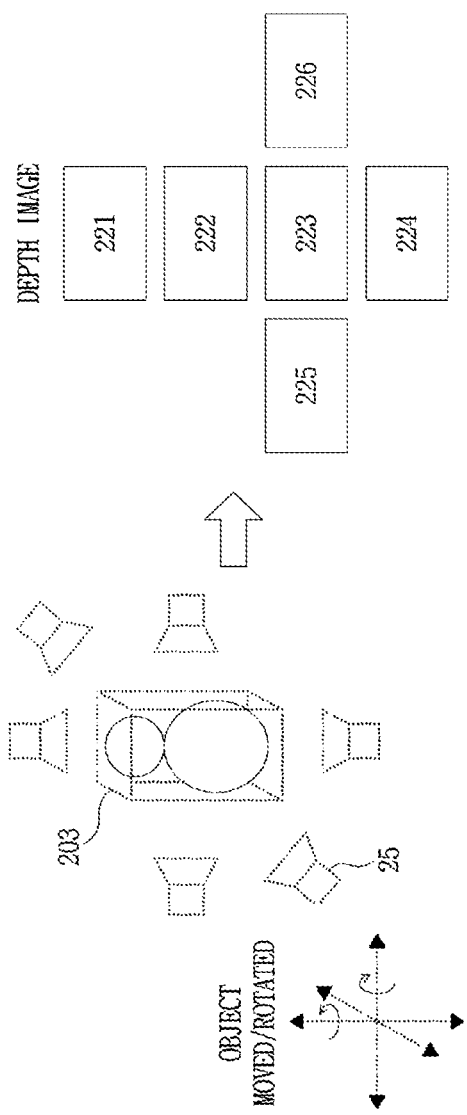
FIG. 2E is a view exemplifying a depth image of an object that is detected by movement of a camera when an apparatus for reconstructing 3D information of an object according to an embodiment of the present disclosure reconstructs 3D information of the object.

Further, referring to FIG. 2E, the 3D information reconstructor 15 can obtain depth images of the object detected by moving the cameras 11, that is, the images 221, 222, 223, 224, 225, and 226 taken by moving or rotating the cameras 25 around the object.

Further, the 3D information reconstructor 15 can reconstruct the 3D information of the object by combining the depth images based on the images 211, 212, 213, 214, 215, and 216 detected by moving the object with the depth images based on the images 221, 222, 223, 224, 225, and 226 detected by moving the cameras 25.

Figure 3:
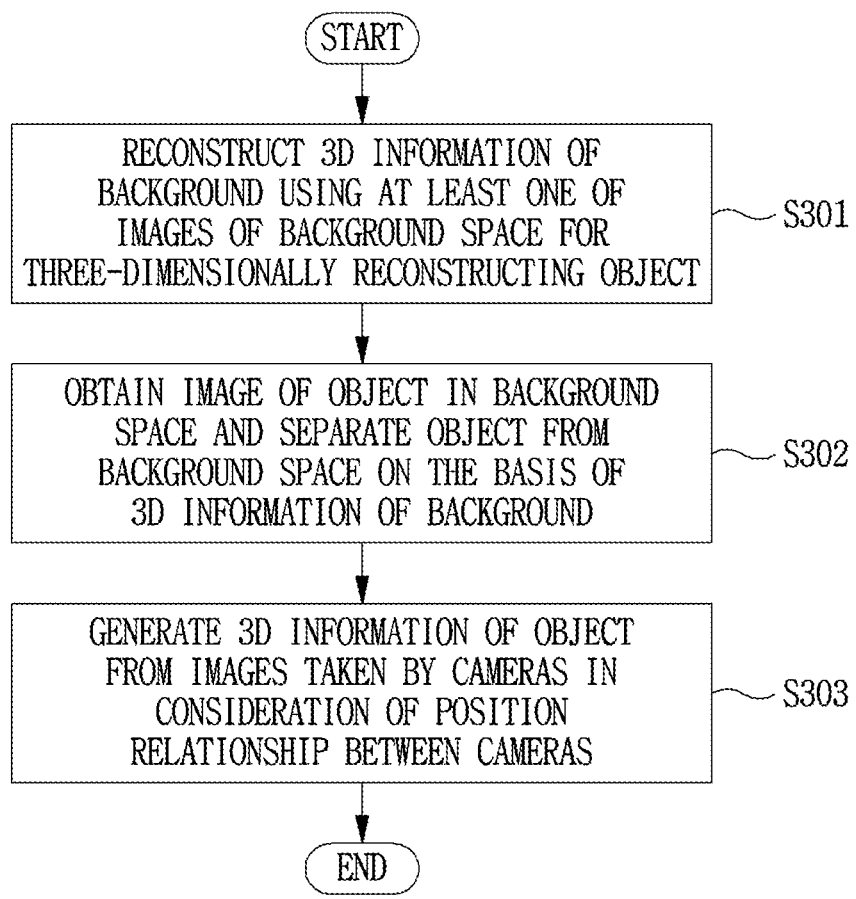
FIG. 3 is a flowchart showing a method of reconstructing 3D information of an object according to an embodiment of the present disclosure.

FIG. 3 is a flowchart showing a method of reconstructing 3D information of an object according to an embodiment of the present disclosure.

The method of reconstructing 3D information of an object can be performed by the apparatus for reconstructing 3D information of an object described above.

First, in step S301, the apparatus for reconstructing 3D information of an object obtains images of a background space 200 for three-dimensionally reconstructing an object from at least one of cameras and reconstructs 3D information of the background space 200 using at least one of images of the background space 200 for three-dimensionally reconstructing the object.

For example, the apparatus for reconstructing 3D information of an object can reconstruct 3D information of the background space on the basis of point-based volumetric representation, surface-based volumetric representation, and implicit surface-based volumetric representation.

Next, an object 201 is put in the background space 200 with the 3D information of the background space 200 reconstructed. In step S302, the apparatus for reconstructing 3D information of an object can obtain at least one of images of the object 201 in the background space 200 and can separate the object 201 from the background space 200 on the basis of the 3D information of the background space 200.

For example, the apparatus for reconstructing 3D information of an object can determine the 3D information of the background space 200 and can estimate images of the background space that can be obtained at positions corresponding to the cameras taking the at least one of images. Further, the apparatus for reconstructing 3D information of an object can determine differences between the images of the object 201 and the estimated images of the background space, can extract outlier of the object on the basis of the differences, and can obtain a depth image of the object on the basis of the outlier.

Further, the depth image of the object extracted on the basis of the outlier may include noise that a consumer-level depth sensor has, and the noise can be removed by an erosion filter and a bilateral filter. As another embodiment, the noise in the depth image of the object may be removed in consideration of a noise model reflecting the characteristic of the depth sensor.

Next, in step S303, the apparatus for reconstructing 3D information of an object can generate 3D information of the object on the basis of the images taken by the cameras in consideration of the positional relationships between the depth image of the object and the cameras.

In detail, the apparatus for reconstructing 3D information of an object can generate a state map of an object volume space 203 by setting the object volume space 203 corresponding to the area where the object 201 exists on the basis of the depth image of the object 201 and matching the 3D information of the background space 200 and the depth image of the object with each other.

A user can pick up and move or rotate the object 201 with his/her hand 205, but in this case, the user's hand 205 is added to the outer surface of the object, so it needs to be removed. The apparatus for reconstructing 3D information of an object can remove image information corresponding to the user's hand 205, using a state change technique that uses slow adaptation. For example, an object can continuously exist in the object volume space 203, but the user's hand 205 can exist only for a relatively short time in the object volume space 203. In consideration of this fact, the apparatus for reconstructing 3D information of an object can detect the object 201 by changing a state by applying slow adaptation to the object in the object volume space 203. That is, the apparatus for reconstructing 3D information of an object can determine only elements (for example, a point or a surface) that exist over a predetermined time in the object volume space 203 as elements constituting the object 201. In contrast, it is possible to determine an element existing under the predetermined time in the object volume space 203 as the user's hand 205 and remove the element.

As described above, it is possible to obtain at least one of images 211, 212, 213, 214, 215, and 216 by moving or rotating the object 201 and can remove the user's hand 205 from the images 211, 212, 213, 214, 215, and 216 using the state change technique that uses slow adaptation.

Further, the apparatus for reconstructing 3D information of an object can obtain depth images of the object detected by moving the cameras, that is, the images 221, 222, 223, 224, 225, and 226 taken by moving or rotating the cameras around the object.

Further, the apparatus for reconstructing 3D information of an object can reconstruct the 3D information of the object by combining the depth images based on the images 211, 212, 213, 214, 215, and 216 detected by moving the object with the depth images based on the images 221, 222, 223, 224, 225, and 226 detected by moving the cameras.

Figure 4:
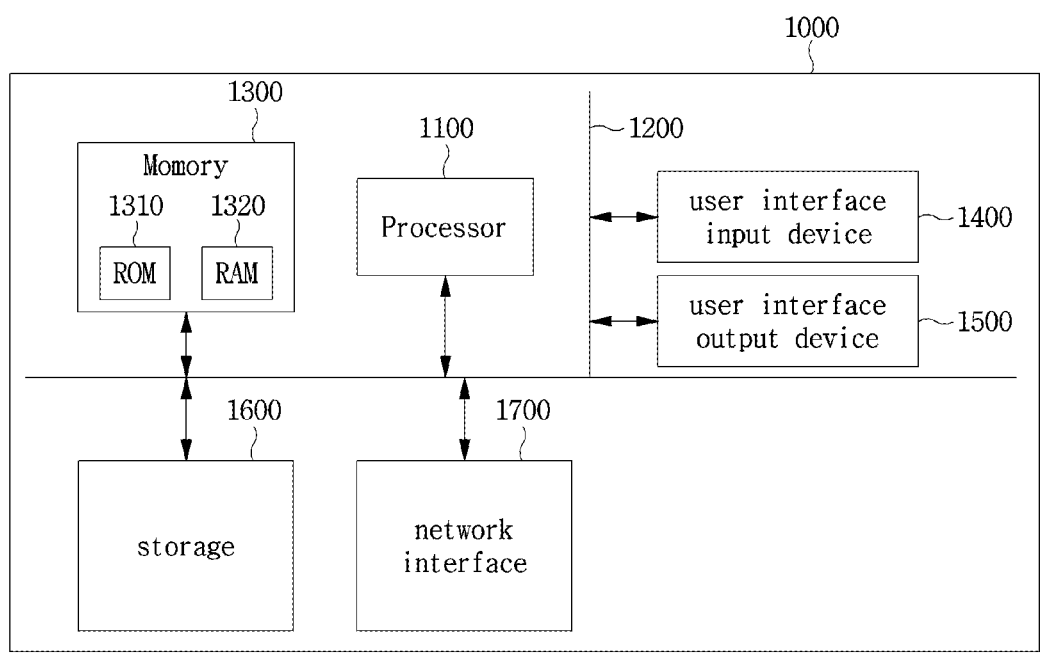
FIG. 4 is a block diagram exemplifying a computing system for implementing the apparatus and method of reconstructing 3D information of an object according to an embodiment of the present disclosure.

FIG. 4 is a block diagram exemplifying a computing system for implementing the apparatus and method of reconstructing 3D information of an object according to an embodiment of the present disclosure.

Referring to FIG. 4, a computing system 100 may include at least one processor 1100 connected through a bus 1200, a memory 1300, a user interface input device 1400, a user interface output device 1500, a storage 1600, and a network interface 1700.

The processor 1100 may be a central processing unit or a semiconductor device that processes commands stored in the memory 1300 and/or the storage 1600. The memory 1300 and the storage 1600 may include various volatile or non-volatile storing media. For example, the memory 1300 may include a ROM (Read Only Memory) and a RAM (Random Access Memory).

Accordingly, the steps of the method or algorithm described in relation to the embodiments of the present disclosure may be directly implemented by a hardware module and a software module, which are operated by the processor 1100, or a combination of the modules. The software module may reside in a storing medium (that is, the memory 1300 and/or the storage 1600) such as a RAM memory, a flash memory, a ROM memory, an EPROM memory, an EEPROM memory, a register, a hard disk, a detachable disk, and a CD-ROM. The exemplary storing media are coupled to the processor 1100 and the processor 1100 can read out information from the storing media and write information on the storing media. Alternatively, the storing media may be integrated with the processor 1100. The processor and storing media may reside in an application specific integrated circuit (ASIC). The ASIC may reside in a user terminal. Alternatively, the processor and storing media may reside as individual components in a user terminal.

The exemplary methods described herein were expressed by a series of operations for clear description, but it does not limit the order of performing the steps, and if necessary, the steps may be performed simultaneously or in different orders. In order to achieve the method of the present disclosure, other steps may be added to the exemplary steps, or the other steps except for some steps may be included, or additional other steps except for some steps may be included.

Various embodiments described herein are provided to not arrange all available combinations, but explain a representative aspect of the present disclosure and the configurations about the embodiments may be applied individually or in combinations of at least two of them.

Further, various embodiments of the present disclosure may be implemented by hardware, firmware, software, or combinations thereof. When hardware is used, the hardware may be implemented by at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), a general processor, a controller, a micro controller, and a micro processor.

The scope of the present disclosure includes software and device-executable commands (for example, an operating system, applications, firmware, programs) that make the method of the various embodiments of the present disclosure executable on a machine or a computer, and non-transitory computer-readable media that keeps the software or commands and can be executed on a device or a computer.

What is claimed is:

1. A method of reconstructing 3D information of an object, the method comprising:
   reconstructing 3D information of a background space, using at least one of images of the background space for three-dimensionally reconstructing the object;
   separating the object from the background space on the basis of at least one of images of the object in the background space, and of obtaining a depth image of the object separated from the background space; and
   generating 3D information of the object based on images taken by at least one of cameras in consideration of position relationships between the depth image of the object and the cameras,
   wherein the generating of the 3D information of the object includes:
      setting an object volume space corresponding to an area where the object exists; and
      generating a state map of the object volume space, using the 3D information of the background space and the depth image of the object.

2. The method of claim 1, wherein the obtaining of the depth image of the object includes determining the 3D information of the background space and outlier based on correspondence relationship information between objects in the background space.

3. The method of claim 2, wherein the obtaining of the depth image of the object further includes removing noise from the images of the object.

4. The method of claim 1, wherein the generating of the 3D information of the object further includes removing image information corresponding to a substance holding the object on the basis of a state change technique that uses slow adaptation.

5. The method of claim 4, wherein the state change technique using slow adaptation determines elements existing over a predetermined time in the object volume space as elements constituting the object and determines elements existing under the predetermined time in the object volume space as elements constituting the substance holding the object.

6. The method of claim 1, wherein the generating of the 3D information of the object further includes:
   setting relative positions between the object volume space and the cameras; and
   determining a change in the relative positions between the object volume space and the cameras and generating the 3D information of the object corresponding to the relative positions between the object volume space and the cameras.

7. The method of claim 1, wherein the images of the background space, the images of the object, and the images taken by the cameras are depth images.

8. An apparatus for reconstructing 3D information of an object, the apparatus comprising:

at least one of cameras taking images for reconstructing 3D information;

a background information reconstructor reconstructing 3D information of a background space for three-dimensionally reconstructing an object, using at least one of images of the background space;

a background/object separator separating the object from the background space on the basis of at least one of images of the object in the background space, and obtaining a depth image of the object separated from the background space; and a 3D information reconstructor generating 3D information of the object based on images taken by the cameras in consideration of positional relationships between the depth image of the object and the cameras, wherein the 3D information reconstructor sets an object volume space corresponding to an area where the object exists, and generates a state map of the object volume space, using the 3D information of the background space and the depth image of the object.

9. The apparatus of claim 8, wherein the background/object separator determines the 3D information of the background space and outlier based on correspondence relationship information between objects in the background space, and generates a depth image of the object using the outlier.

10. The apparatus of claim 9, wherein the background/object separator includes a noise remover removing noise information from the images of the object.

11. The apparatus of claim 8, wherein the 3D information reconstructor removes image information corresponding to a substance holding the object on the basis of a state change technique that uses slow adaptation.

12. The apparatus of claim 11, wherein the state change technique using slow adaptation determines elements existing over a predetermined time in the object volume space as elements constituting the object and determines elements existing under the predetermined time in the object volume space as elements constituting the substance holding the object.

13. The apparatus of claim 8, wherein the 3D information reconstructor sets relative positions between the object volume space and the cameras, determines a change in the relative positions between the object volume space and the cameras, and generates the 3D information of the object corresponding to the relative positions between the object volume space and the cameras.

14. The apparatus of claim 8, wherein the cameras are depth cameras taking depth images.

* * * * *